Figure 1:
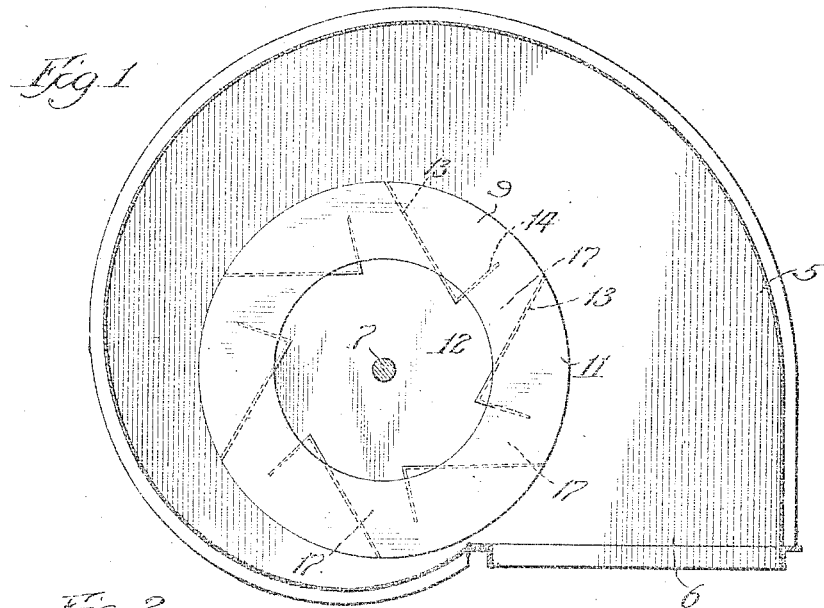

H. P. GALE.
FAN OR BLOWER.
APPLICATION FILED MAY 5, 1910.

1,049,472.

Patented Jan. 7, 1913.

Witnesses:
Geo. C. Davies
M. A. Kiddie

Inventor:
Henry P. Gale
By Dithieun, Belt & Fuller
Attys

UNITED STATES PATENT OFFICE.

HENRY P. GALE, OF CHICAGO, ILLINOIS.

FAN OR BLOWER.

1,049,472.    Specification of Letters Patent.    Patented Jan. 7, 1913.

Application filed May 5, 1910. Serial No. 559,654.

*To all whom it may concern:*

Be it known that I, HENRY P. GALE, a citizen of the United States, and resident of Chicago, Cook county, Illinois, have invented certain new and useful Improvements in Fans or Blowers, of which the following is a specification.

My invention relates to fans or blowers, and has particular reference to fans of a centrifugal type.

In the ordinary type of fan, the housing has an inlet opening therein through which the air passes to a position at or near the axis of rotation of the fan blades. Inasmuch as these blades are rapidly revolving, the air is thrown by centrifugal force toward the periphery of the rotating fan wheel, and this air is then expelled through a suitable outlet in the housing. The force which has been utilized up to the present time in driving the air through fans is the centrifugal force just described. I have discovered that a second force may be advantageously utilized, namely, the force of eduction which is the aspirating force exerted by a fluid acting on the end of a tube in a direction substantially at a right angle to the axis of the latter, and the efficiency of the fan thereby greatly increased. By constructing my fan so that this force of eduction is utilized to the greatest extent, I have succeeded in operating fans at a practical efficiency of 85 to 90 per cent., and even more, whereas the highest efficiency which has been obtained in the case of fans of the prior art has not exceeded a theoretical maximum of 65 per cent., and has fallen much below this in practical efficiency.

In order to have a thorough comprehension of my fan, it will be necessary to describe the theoretical principles which cause its efficient operation.

If an ordinary tube is cut on its end so that this end forms an angle of approximately 54 degrees with the main axis of the tube, and the tube is placed with its main axis perpendicular to the current of air and with its obliquely cut end facing in the direction from which the air flows, it has been found that no air will enter this tube, nor will any air be drawn from the tube by eduction. Now, if instead of using a tube whose end has been cut off at an angle of 54 degrees, a tube having its end cut off at an angle of 90 degrees, is used, it has been found that there is a certain force of eduction acting upon the air within the tube, this force being measured by the displaced water in an ordinary draft gage. If, instead of using a tube having its end cut off at an angle of 54 degrees with this obliquely cut end facing the main current of air, we use the same tube but place it in such a position that the obliquely cut end faces the direction toward which the current of air flows, we shall now find that the force of eduction as measured by a draft gage is equivalent to twice that which was exerted in the case of the tube having its end cut off at an angle of 90°. If, instead of having the tubes which we have described stationary in a current of moving air or other fluid, we reverse the process and move the tubes, we shall obtain results which are exactly analogous. It is the means for utilizing this principle which forms the subject matter of my invention.

In my improved fan the fan wheel comprises a plurality of buckets, each bucket having a long and a short blade which are outwardly converging toward each other, the angle between the line normal to and connecting the outer edges of these blades and the radius of the fan wheel extending to the edge of the longer blade and normal thereto being, preferably, approximately fifty-four degrees (54°). In rotating the fan wheel the longer blade of each bucket precedes the shorter blade. A sufficient space is provided between the periphery of the fan wheel and the housing so that the air in such space is relatively still, thereby causing the buckets to exert an effective force, both eductive and centrifugal, for drawing the air or other fluid through the buckets into the space between the fan wheel and the housing.

Each fan bucket is constructed with a suitable taper toward its outer end so that the pressure of air remains the same in all parts of the bucket, while the velocity increases toward its outer end.

I have found that when curved blades are employed there is a strong tendency for dust contained in the air to collect in the curves of the blades, so that I prefer to form the blades straight and thus prevent any possibility of dust collecting in this manner.

Figure 2:
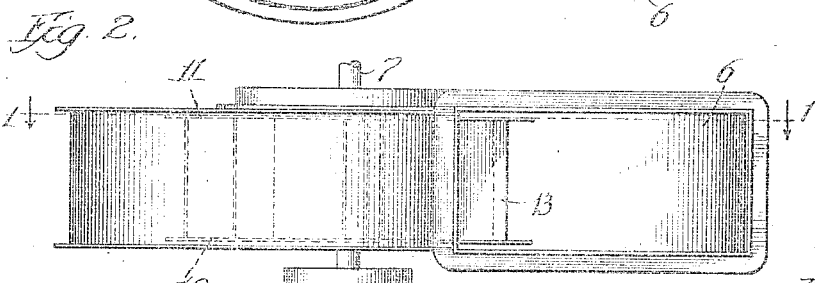
Figure 3:
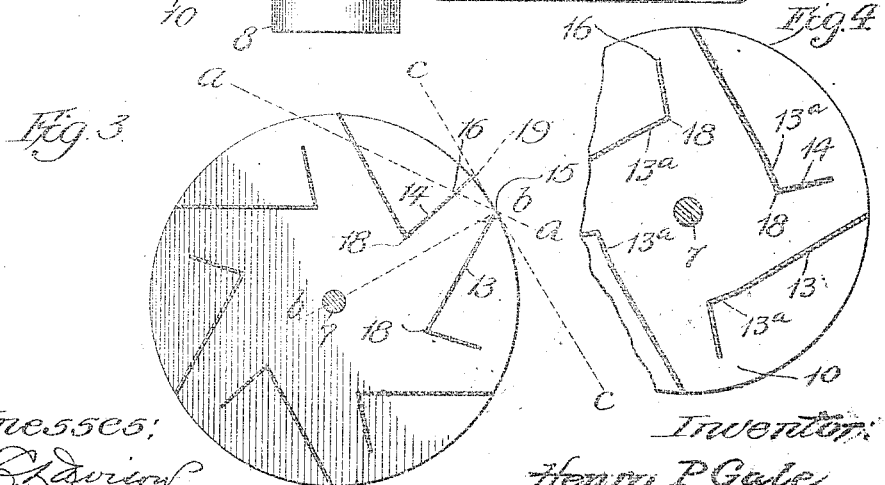
Figure 4:
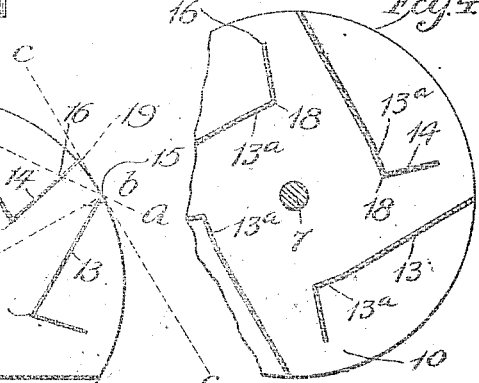

Not only may my fan be used in connection with air and similar gases, but it may also be employed as a centrifugal pump for liquids. I have found that in the latter case, the same superior results are obtained as when it is used as a fan for gases. These and other advantages of my invention will be more clearly understood by reference to the accompanying drawings which show a preferred embodiment of my improvements and in which:

Figure 1 is a vertical section through the fan housing on the line 1—1 of Fig. 2 showing the fan wheel in position. Fig. 2 is a bottom plan view of the fan. Fig. 3 is a vertical section through the fan wheel. Fig. 4 is a fragmentary vertical section through a modified form of fan wheel.

The housing 5 consists of a so-called scroll at the outer end of which is the outlet opening 6. A shaft 7 provided on one end with a pulley 8, passes transversely through the housing 5, and mounted on this shaft is the fan wheel 9. The fan wheel 9 preferably has the sides 10 and 11, the side 11 having an opening 12 in its central portion which registers with a similar opening in the side of the housing 5. Rigidly mounted between the sides 10 and 11 of the fan wheel, are the blades 13 which at their innermost portions are connected with the shorter blades 14.

In the particular embodiment of my invention which is illustrated in the drawings, I have shown the fan wheel as provided with six of the longer blades 13, and six of the shorter blades 14. I could, however, readily vary the number of these blades without departing from the spirit of my invention as shown for example, in Fig. 4, if the number of blades is decreased, instead of constructing the blades 13 so that they connect directly with the blades 14, the former would connect to intermediate strips 13$^a$ leading from the inner edges of the blades 13, to the inner edges of the blades 14. As most clearly shown in Fig. 3 if line $a$—$a$ is drawn between the outer edge 15 of any blade 13, and the outer edge 16 of the coöperating blade 14, and normal to said edges, this line $a$—$a$ will form with the line $b$—$b$, drawn from the axis of the fan wheel 9 to the outer edge 15 and normal thereto, an angle of approximately 54 degrees.

The operation of my invention may now be readily understood. The fan wheel 9 being rotated by means of a suitable belt connected with the pulley 8, air will be expelled by the action of centrifugal force through each of the buckets 17 formed between the blades 13 and 14. The fan wheel is rotated in what would be a clock-wise direction, as shown in Figs. 1 and 3, so that in the case of each bucket, the long blade 13 of the bucket would precede the short blade 14. As the fan wheel rotates we therefore have not only a centrifugal action which causes the air to be thrown outwardly to the periphery of the fan wheel, but there is also exerted at the end of each bucket a force of eduction which aids the centrifugal force and serves, by creating a partial vacuum at the end of each bucket between the edges 15 and 16, to draw air from within the fan wheel. This force of eduction is caused by the action of the relatively still large quantity of air lying within the scroll of the blower between the periphery of the fan wheel and the housing 5. On account of the combined action of centrifugal force and eduction, which I have just described, a vacuum is now created within the fan wheel itself, and the result of this is that new air from the exterior passes into the fan wheel through the lateral opening in the sides of the housing 5, and through the opening 12 in the side of the fan wheel. The air which has been expelled through the outer ends of the buckets 17, passes into the space lying between the periphery of the fan wheel and the housing 5 and from thence it is propelled through the outlet opening 6. The space between the periphery of the fan wheel and the wall of the housing is sufficiently large so that there will be no back pressure which would tend to hold back the air within the fan wheel 9.

Each of the buckets 17 is so proportioned that the outlet opening between the edges 15 and 16 of the blades 13 and 14 is of a size proportional to the position of the inlet opening between the edges 18 of the blades. For example, if the edges 18 are located half way between the axis of rotation of the fan wheel and its periphery, it will be apparent that the periphery of the blade is traveling at a speed twice as great as the speed of the edges 18, and for this reason, the area of the opening between the edges 15 16 should be half that between the edges 18. In this way, the air, which is expelled from the outer opening in each of the buckets 17, at a velocity equal to that of the periphery of the fan wheel, would be at precisely the same pressure as the air which is drawn into the inner opening of each bucket at half the speed.

Although I have found that the maximum efficiency of the fan is obtained by having the line $a$—$a$ at an angle of approximately 52 to 54 degrees to the line $b$—$b$ for the reasons which have been explained in detail in the previous part of this specification, I have also found that the efficiency of the fan, that is, the power which is required to drive a given amount of air therethrough at the predetermined speed of rotation of the fan wheel, may be varied by changing the angle formed between the edges 15 and 16 of the blades 13 and 14, and the line drawn from the edge 15 to the axis of rotation. For example, the blade 14 might be extended so that its edge would lie at 19 and the line $c$—$c$ drawn to intersect the edges 19 and 15 would be tangential to the periphery of the fan wheel, and therefore, form an angle of 90 degrees with the line b—b. The force of eduction in this case would, for the reasons explained above, be reduced by approximately 50 per cent., and the efficiency of the fan would be correspondingly lessened.

It will thus be apparent that I have not only perfected means by which the efficiency of a fan may be increased, but I have also evolved a method by which the efficiency of the fan may be regulated as desired.

I ordinarily employ two sides for the fan wheel, the blades forming the buckets being attached to these sides. I may, however, attach the blades directly to the shaft 7 by means of a suitable frame, and thus entirely eliminate the side members 10 and 11. In this case, the blades should be constructed so that their sides have only a slight clearance from the side walls of the housing.

It will be apparent that many changes may be made in the detailed construction of the apparatus which I have described without departing from the spirit of my invention.

What I claim:

1. In a fan, the combination of a housing, and a rotatable fan wheel within said housing, said fan wheel comprising a plurality of buckets, each of said buckets having a pair of blades of different lengths, a line between the outer edges of said blades at points which lie in the same plane at right angles to the axis of rotation of the fan wheel forming an acute angle with the radius of the fan wheel connecting to the outer edge of the longer blade, the space between the periphery of said fan wheel and the housing being relatively large, whereby the peripheral speed of the fan wheel is greater than the velocity of the fluid moved within said housing, thereby causing each of said buckets to exert a combined eductive and centrifugal force on the fluid within said fan wheel, substantially as described.

2. In a fan, the combination of a scroll housing, and a fan wheel within said housing, the space between the periphery of said fan wheel and said housing gradually increasing toward the outlet from the latter, said fan wheel comprising a plurality of buckets, each of said buckets having a pair of blades of different lengths, a line between the outer edges of said blades at points which lie in the same plane at right angles to the axis of rotation of the fan wheel forming an acute angle with the radius of the fan wheel connecting to the outer edge of the longer blade, whereby on rotation of the fan wheel the relatively still fluid contained between the periphery of the fan wheel and the housing causes each of said buckets to exert an eductive force on the fluid contained within said fan wheel, substantially as described.

3. In a fan, the combination of a housing, and a rotatable fan wheel within said housing, the space between the periphery of said fan wheel and said housing gradually increasing toward the outlet from said housing, said fan wheel comprising a plurality of buckets, each of said buckets having a pair of blades of different lengths, a line between the outer edges of said blades at points which lie in the same plane at right angles to the axis of rotation of the fan wheel forming an angle of from 50° to 65° with the radius of said fan wheel connecting to the outer edge of the longer blade, thereby causing each of said buckets to exert an eductive force on the fluid within said fan wheel on rotation of the latter, substantially as described.

4. In a fan, the combination of a housing, and a fan wheel within said housing, the space between the periphery of said fan wheel and said housing gradually increasing toward the outlet from the latter, said fan wheel comprising a plurality of buckets, each of said buckets tapering toward its peripheral end and comprising a pair of blades of different lengths, each of said buckets having a pair of blades of different lengths, a line between the outer edges of said blades at points which lie in the same plane at right angles to the axis of rotation of the fan wheel forming an angle of from 50° to 65° with the radius of said fan wheel connecting to the outer edge of the longer blade, whereby on rotation of said fan wheel the fluid between the periphery of said wheel and said housing causes each bucket to exert an eductive force on the fluid contained within said fan wheel and the taper of said bucket causes the fluid to increase in velocity in its passage therethrough, substantially as described.

HENRY P. GALE.

Witnesses:
- WM. O. BELT,
- M. A. KIDDIE.